Jan. 19, 1954     G. R. BOUCHARD     2,666,308
UNIVERSAL JOINT DEVICE
Filed Feb. 21, 1951     3 Sheets-Sheet 1
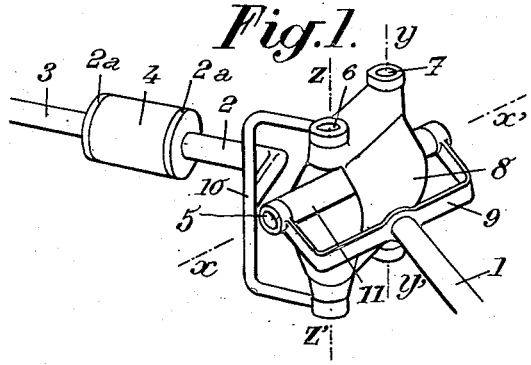
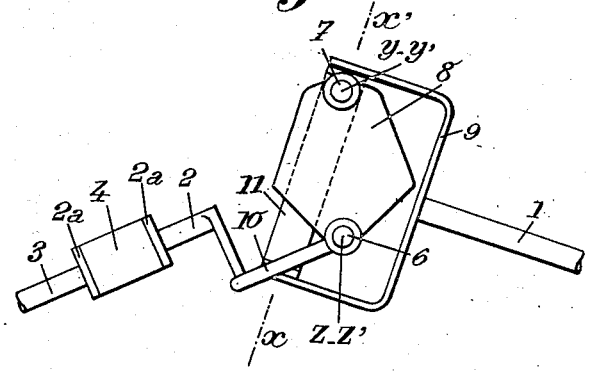
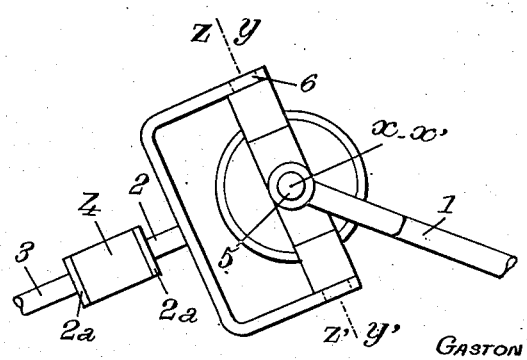
INVENTOR
GASTON ROBERT BOUCHARD
BY
*Bailey, Stephens + Huettig*
ATTORNEYS

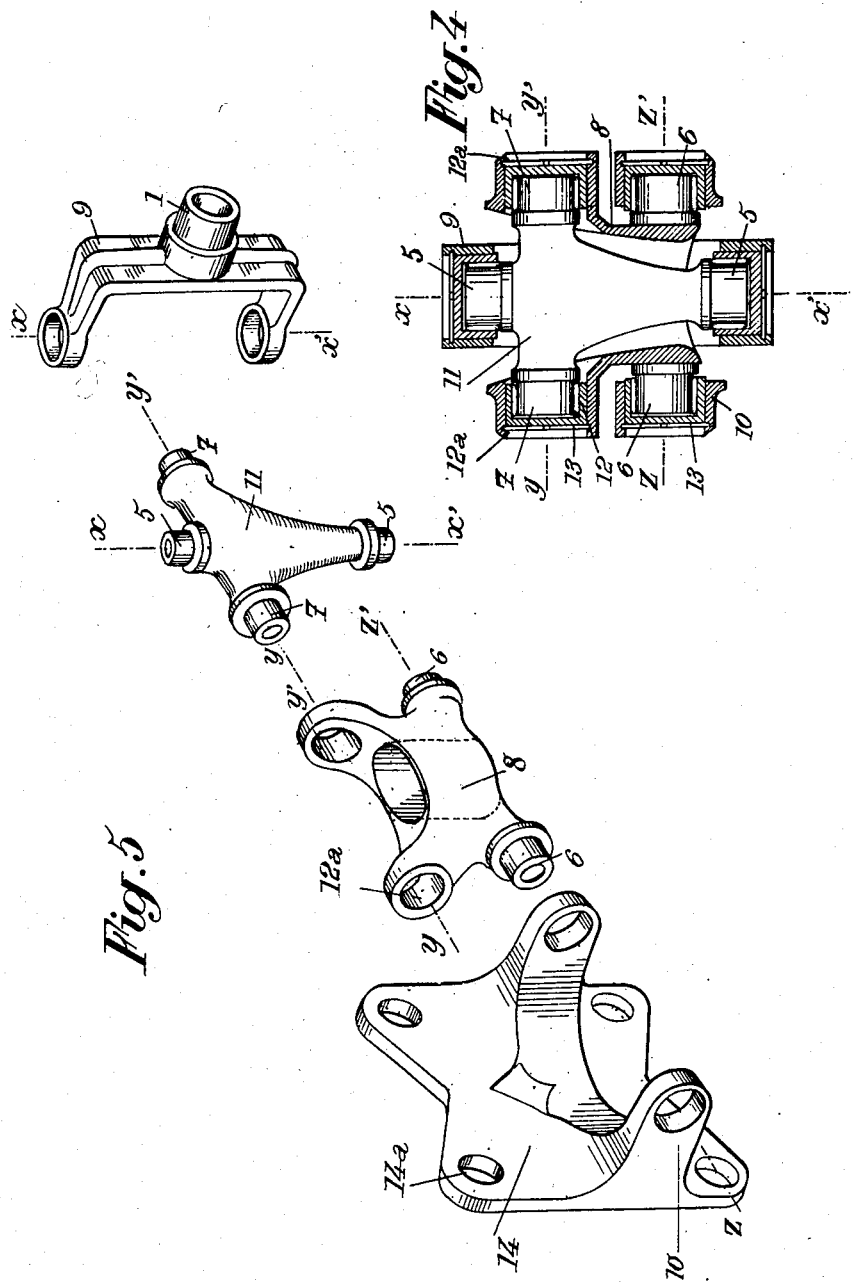

Jan. 19, 1954  G. R. BOUCHARD  2,666,308
UNIVERSAL JOINT DEVICE
Filed Feb. 21, 1951  3 Sheets-Sheet 3
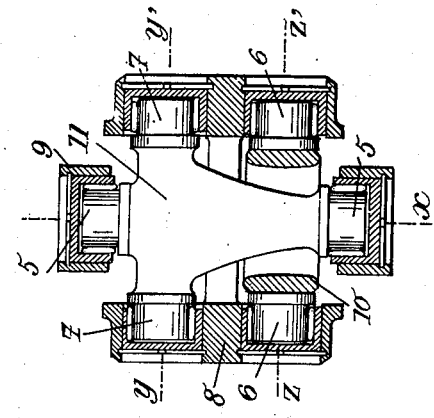
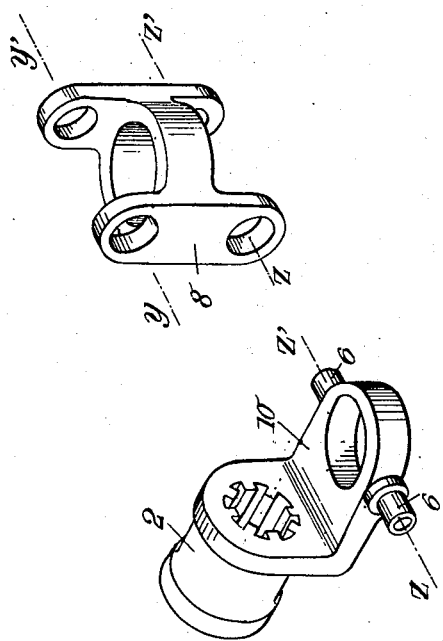
INVENTOR
GASTON ROBERT BOUCHARD
BY
*Bailey, Stephens & Huettig*
ATTORNEYS Patented Jan. 19, 1954

2,666,308

UNITED STATES PATENT OFFICE 2,666,308

UNIVERSAL JOINT DEVICE

Gaston Robert Bouchard, Bougival, France

Application February 21, 1951, Serial No. 211,995
Claims priority, application France
February 28, 1950

5 Claims. (Cl. 64—17)

The present invention relates to universal joint transmission devices, that is to say to rotary devices including a driving shaft and a driven shaft the axes of which at least approximately intersect each other and a joint system for interconnecting these shafts so as to enable them to move relatively to each other, in particular with sliding displacements of at least one of them along its axis, these sliding displacements possibly taking place only in particular conditions, for instance when the device is being fitted on a support which normally prevents, through axial abutments, such sliding displacements. My invention is more especially, although not exclusively, concerned with devices of this kind used for longitudinal or transverse transmission of movement in vehicles, in particular for transmitting the drive from the engine to the driving and steering wheels of a motor vehicle.

The object of my invention is to provide a device of this kind which is simpler than those existing at the present time and capable of reducing axial reactions to a minimum.

For this purpose, according to a main feature of my invention, these shafts are interconnected through at least two intermediate pieces rotatable with respect to each other and to which they are respectively pivoted about pivot axes at right angles, or substantially so, to each other and each at right angles to the corresponding shaft axis, one of these pivot axes being parallel or substantially parallel to the axis about which said two intermediate pieces are rotatable with respect to each other and being located at a distance from the axis of the corresponding shaft, at least one of these two shafts being provided with abutment means which prevent axial sliding thereof.

Preferred embodiments of my invention will be hereinafter described with reference to the accompanying drawings, given merely by way of example and in which:

Figs. 1 to 3 inclusive are a perspective view, a top view and a side view respectively, diagrammatically illustrating the principle of my universal joint transmission device.

Fig. 4 is an axial sectional view of an embodiment of my invention.

Fig. 5 is a perspective view of the elements of the device of Fig. 4, shown separately and disposed side by side.

Figs. 6 and 7 are views similar to Figs. 4 and 5 respectively but relating to another embodiment of my invention.

My universal joint transmission device is to be mounted between a driven shaft 1 and a driving shaft 2. The portion 3 of shaft 2 is connected to a motor, for instance an internal combustion engine, while shaft 1 is coupled with a wheel to be driven (possibly through a uniform speed transmission joint).

It will be supposed that shafts 1 and 2 are mounted in such manner that their respective axes constantly intersect each other (at least approximately) and that one of them, for instance driving shaft 2, is supported by a bearing 4 and is provided with abutment means 2a for preventing it from sliding longitudinally with respect to bearing 4. The other shaft, to wit 1, is, on the contrary, free to slide in the direction of its axis, within certain limits.

The universal joint device intended to transmit the rotation movement of shaft 2 to shaft 1 must enable this axial sliding displacement of shaft 1 to take place.

According to my invention, this universal joint device includes at least two intermediate pieces 8 and 11 to which shafts 1 and 2 are respectively pivoted through pivots 5 (pivot axis $x$—$x'$ between shaft 1 and piece 11) and 6 (pivot axis $z$—$z'$ between piece 8 and shaft 2), these pivot axes being substantially at right angles to each other and pieces 11 and 8 being pivoted to each other through an intermediate pivot 7 (pivot axis $y$—$y'$).

Pivot axis $y$—$y'$ is at least substantially parallel to one of the two other pivot axes, for instance, as shown, to pivot axis $z$—$z'$.

Pivot 6 is off-set laterally with respect to the driving shaft 2, whereby said pivot 6 and the intermediate pivot 7 can be mounted side by side and parallel to each other.

Such a device is very simple and gives rise to practically no axial reaction.

For the sake of clarity, on the drawings, the shafts are shown as pivoted to the intermediate pieces through forks 9 and 10 provided at the ends of said shafts. The plane of fork 10 is parallel to, but distant from, the axis of shaft 2.

I will now describe two preferred embodiments of the universal joint device according to my invention.

According to the embodiment of Figs. 4-5, intermediate piece 11 is cross-shaped and carries two pairs of trunnions or journals 5—5 (pivot axis $x$—$x'$) and 7—7 (pivot axis $y$—$y'$) at right angles to each other. Trunnions 5—5' are adapted to fit journals carried by the fork 9 of shaft 1.

Intermediate piece 8 is in the form of a hollow body. It includes, on the one hand, two bearings 12 (pivot axis $y$—$y'$) adapted to accommodate journals 7—7, and, on the other hand, two journals or trunnions 6—6 (pivot axis $z$—$z'$).

Trunnions 6—6 are adapted to fit in bearings carried by fork 10, which is secured, by means of a plate 14 provided with fixation holes 14a, on shaft 2 in eccentric position with respect to the axis thereof.

It should be noted that it is of interest to provide means for preventing axial displacements of the journals in their respective bearings, these means consisting for instance in elastic abutment rings 13 inserted in said bearings.

The construction of Figs. 6–7 is similar to that of Figs. 4–5, with the difference that, in the pivoting connection between piece 8 and part 10 of shaft 2 about axis $z$—$z'$, the journals 6 are carried by part 10 and the corresponding bearings by piece 8.

Of course, while it is necessary, according to my invention, to have one of the shafts (shaft 2 in the example shown) pivoted to the corresponding intermediate piece (8) about an axis ($z$—$z'$) which does not intersect the axis of said shaft, this does not exclude the possibility of having also the other shaft (1 in this case) pivoted to the corresponding intermediate piece about an axis no longer intersecting the axis of this last mentioned shaft. In this case, it would be advantageous to provide a second intermediate pivot axis rigid with the first one and parallel to the axis about which the last mentioned shaft is pivoted to the corresponding intermediate piece.

The driven shaft may be provided with axial abutment means.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A universal joint transmission which comprises, in combination, two pieces pivoted to each other about a single pivot axis, and two shafts, a driven one and a driving one, pivoted to said pieces about a second pivot axis and a third pivot axis respectively, the second pivot axis substantially intersecting said first mentioned pivot axis and being at least substantially at right angles both to the shaft pivoted thereabout and to said first mentioned pivot axis, the third pivot axis being substantially parallel to said first mentioned pivot axis and located at a distance therefrom and substantially at right angles to the shaft pivoted thereabout, said last mentioned shaft being offset with respect to said third pivot axis toward the first mentioned one, the other shaft being offset with respect to the first mentioned pivot axis toward the third pivot axis, the amount of offsetting of said shafts with respect to said first and third mentioned pivot axes respectively being such that the distance between the respective axes of said shafts is substantially smaller than the distance between said first and third mentioned pivot axes, when said shafts extend in opposed parallel directions and said first and third mentioned pivot axes are substantially in a plane transverse to said directions.

2. For use in a system including two shafts mounted pivotable and slidable with respect to each other so that their axes at least approximately intersect each other and the distance to which the adjacent ends thereof can be brought from each other is limited, a universal joint device for coupling said shafts with each other which comprises, in combination, two pieces pivoted to each other about a single pivot axis, pivot means for pivotally connecting one of said shafts with one of said pieces about a single pivot axis at least substantially at right angles both to said shaft and to said first mentioned pivot axis and which intersects at least approximately the axis of said shaft, means interposed between said last mentioned shaft and said pivot means for offsetting said shaft with respect to said first mentioned pivot axis in a direction parallel to said second mentioned pivot axis, pivot means for pivotally connecting the other of said shafts with the other of said pieces about a single pivot axis at least substantially at right angles to said second mentioned shaft and parallel to said first mentioned pivot axis at a substantial distance therefrom, this last mentioned distance being sufficiently great as compared to the maximum distance to which the adjacent ends of said shafts may be brought from each other to cause the plane passing through the first and third mentioned pivot axes to be always transverse to the directions of said shafts, and means interposed between the second mentioned shaft and the second mentioned pivot means for offsetting the last mentioned shaft with respect to the third mentioned pivot axis in a direction transverse to said last mentioned pivot axis, the directions and amounts of offsetting of said shafts being such that they are substantially in line with each other when they extend in opposed directions substantially at right angles to the plane defined by the first and third mentioned pivot axes.

3. For use in a system including two shafts mounted pivotable and slidable with respect to each other so that their axes at least approximately intersect each other and the distance to which the adjacent ends thereof can be brought from each other is limited, a universal joint device for coupling said shafts together which comprises, in combination, a cross-shaped male piece having two pairs of alined branches the respective axes of which are at right angles to each other, the two opposed branches of one pair being of the same length whereas one of the branches of the other pair is longer than the other branch of said second mentioned pair, a female piece at least partly surrounding said male piece and pivoted thereto about a single pivot axis constituted by the axis of said first mentioned pair of branches thereof, said female piece extending from said first mentioned pair of branches toward the end of the longer branch of said second mentioned pair of branches, a fork pivoted to said male piece about a single pivot axis constituted by the axis of said second mentioned pair of branches, said fork being fixed to one of said shafts so that the axis of said last mentioned shaft at least substantially intersects the axis of said second mentioned pair of branches about halfway between the ends of the branches of said pair and substantially at right angles thereto, and a member pivoted to said female piece about a single pivot axis at least substantially parallel to the axis of said first mentioned pair of branches and at a substantial distance therefrom, said member being fixed to the other shaft so that the axis of said last mentioned shaft at least substantially intersects the axis of said second mentioned pair of branches about halfway between the ends of the branches of said pair and substantially at right angles to said three above mentioned pivot axes when said three pivot axes are in the same plane.

4. A universal joint according to claim 3 in which the ends of said first mentioned pair of branches of said male piece form a first pair of journals respectively having as their common axis the axis of said first mentioned pair of branches and the ends of said second mentioned pair of branches of said male piece form a second pair of journals respectively having as their common axis the axis of said second mentioned pair of branches, said fork being provided with a pair of bearings mounted in cooperative engagement with said pair of journals of said second pair of branches respectively and said female piece being provided with a pair of bearings mounted in cooperative engagement with said pair of journals of said first pair of branches, said female piece further including a pair of journals located along said third mentioned pivot axis, and said member fixed to the second mentioned shaft being provided with a pair of bearings in cooperative engagement with said last mentioned pair of journals.

5. A universal joint according to claim 3 in which the ends of said first mentioned pair of branches of said male piece form a first pair of journals respectively having as their common axis the axis of said first mentioned pair of branches and the ends of said second mentioned pair of branches of said male piece form a second pair of journals respectively having as their common axis the axis of said second mentioned pair of branches, said fork being provided with a pair of bearings mounted in cooperative engagement with said pair of journals of said second pair of branches respectively and said female piece being provided with a pair of bearings mounted in cooperative engagement with said pair of journals of said first pair of branches, said female piece being further provided with a second pair of bearings located along said third mentioned pivot axis, and said member fixed to the second mentioned shaft including a pair of journals in cooperative engagement with said last mentioned pair of bearings.

GASTON ROBERT BOUCHARD.

References Cited in the file of this patent

UNITED STATES PATENTS

| Number | Name | Date |
|---|---|---|
| 2,380,646 | Harrington | July 31, 1945 |
| 2,553,020 | Urschel | May 15, 1951 |

FOREIGN PATENTS

| Number | Country | Date |
|---|---|---|
| 488,279 | Great Britain | 1938 |